US 6,406,182 B1

(12) United States Patent
Chen

(10) Patent No.: US 6,406,182 B1
(45) Date of Patent: Jun. 18, 2002

(54) STRUCTURE OF THE MEASURING END OF A CLINICAL THERMOMETER

(76) Inventor: Min-Ying Chen, PO Box 82-144, Taipei (TW)

( * ) Notice: Subject to any disclaimer, the term of this patent is extended or adjusted under 35 U.S.C. 154(b) by 0 days.

(21) Appl. No.: 09/497,103

(22) Filed: Feb. 3, 2000

(51) Int. Cl.$^7$ .......................... G01K 1/14; G01K 1/00; F16C 11/00; F16D 1/12; F16D 3/00
(52) U.S. Cl. .................... 374/208; 403/84; 403/119
(58) Field of Search .................... 374/208; 403/83, 403/84, 86, 92, 95, 119

(56) References Cited

U.S. PATENT DOCUMENTS

| 3,419,295 | A | * | 12/1968 | Small ........................... 403/92 |
| 5,013,161 | A | * | 5/1991 | Zaragoza et al. ............ 374/208 |
| 5,442,831 | A | * | 8/1995 | Yamada ........................ 403/92 |
| 5,458,121 | A | * | 10/1995 | Harada ....................... 374/130 |
| 6,129,673 | A | * | 10/2000 | Fraden ........................ 600/549 |

FOREIGN PATENT DOCUMENTS

| JP | 61102528 A | * | 5/1986 | .................... 73/736 |
| JP | 0184429 | * | 7/1989 | .................. 374/208 |
| JP | 11108769 | * | 4/1999 | |

* cited by examiner

Primary Examiner—Diego Gutierrez
Assistant Examiner—Lydia DeJesus
(74) Attorney, Agent, or Firm—A & J

(57) ABSTRACT

An improved structure of the measuring end of a clinical thermometer having a body and a measuring end, characterized in that an pivotal actuating articulation is formed at the junction connecting the measuring end and the body such that the measuring end can be turned and positioned at an angle, thereby the user can hold the thermometer in a comfortable position in measuring the body temperature. The positioning of the pivotal actuating articulation is attained by having a protrusion in engagement with a cavity or an embossed mark. The entire surface of the thermometer is covered with a soft material outerjacket such that the articulation is hidden.

4 Claims, 5 Drawing Sheets

STRUCTURE OF THE MEASURING END OF A CLINICAL THERMOMETER

BACKGROUND OF THE INVENTION a) Technical Field of the Invention

The present invention relates to an improved structure of the measuring end of a clinical thermometer, and in particular to a measuring end which can be turned or adjusted to an appropriate angle to facilitate holding and measuring the temperature of the body.

b) Description of the Prior Art

Conventional digital clinical thermometer has a tapered measuring end at one end for measuring the body temperature at the armpit or in the mouth. The outer surface of this clinical thermometer is rigid and the measuring end cannot be appropriately adjusted to facilitate measuring. As a result, when measuring the body temperature at the armpit, the end section of the thermometer extends the shirt and the user has to apply a bigger force to clip the thermometer with his armpit. This is rather uncomfortable. Recently, there are clinical thermometers with a turnable measuring end, but this measuring end has an elastic force to restore to its original shape. That is, the measuring head cannot be positioned at a desired position for measuring the body temperature. Therefore, it is the main aim of the inventor to provide a clinical thermometer having a measuring end which is turnable and temporary positioned which facilitates temperature measuring of the body.

SUMMARY OF THE INVENTION

Accordingly, it is an object of the present invention to provide an improved structure of the measuring end of a clinical thermometer, wherein at the junction of the measuring end and the thermometer body, a pivotal actuating articulation is mounted such that the measuring end can be adjusted to an appropriate angle, and a protrusion or an embossed mark is provided at the articulation to position the measuring end.

Yet another object of the present invention is to provide an improved structure of the measuring end of a clinical thermometer, wherein the entire surface of the thermometer is enclosed with a soft jacket body, or a soft material is provided to the actuating articulation to cover or to hide the articulation.

The foregoing objects and summary provide only a brief introduction to the present invention. To fully appreciate these and other objects of the present invention as well as the invention itself, all of which will become apparent to those skilled in the art the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
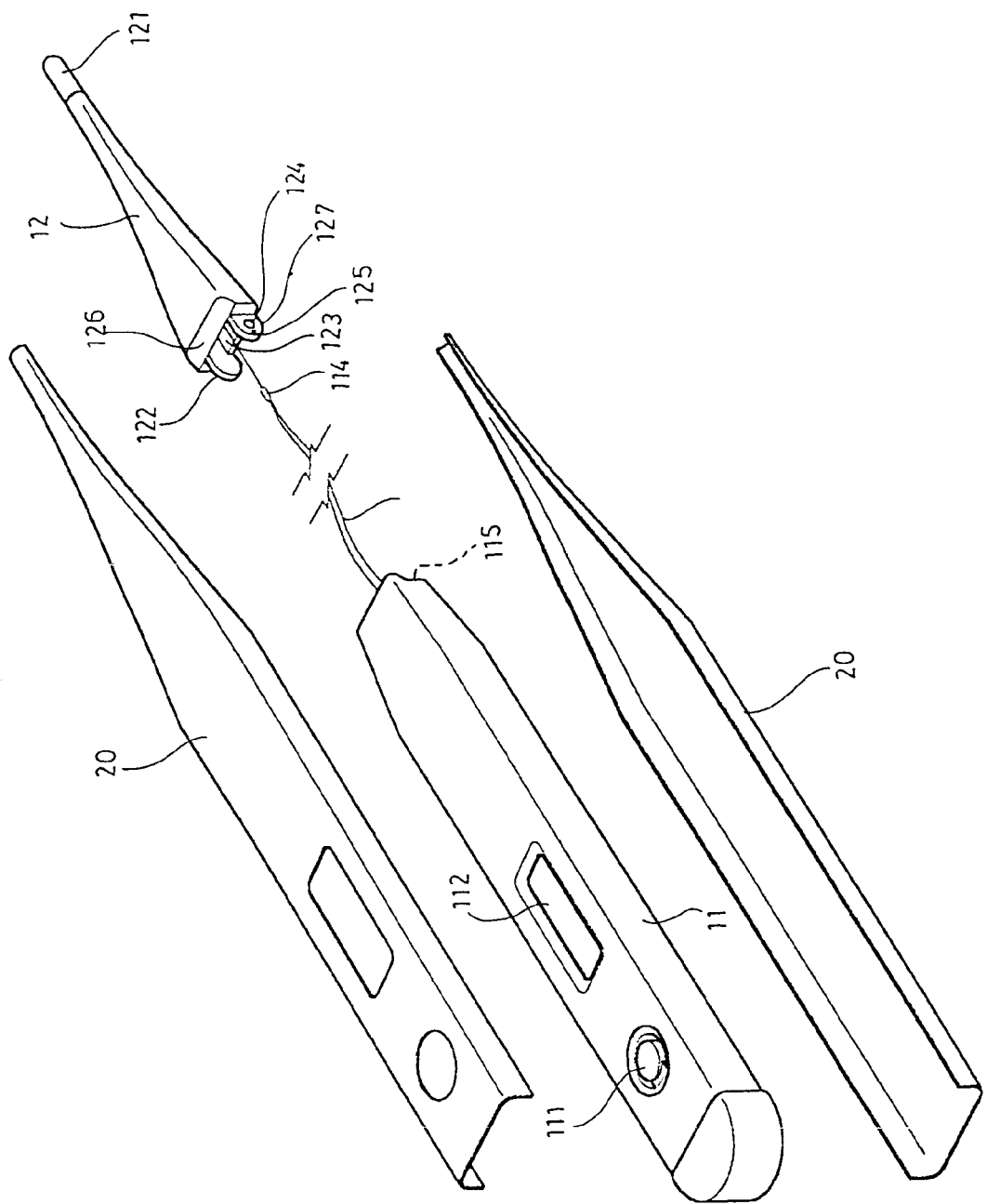
FIG. 1 is a perspective exploded view of an improved structure of the measuring end of a clinical thermometer of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
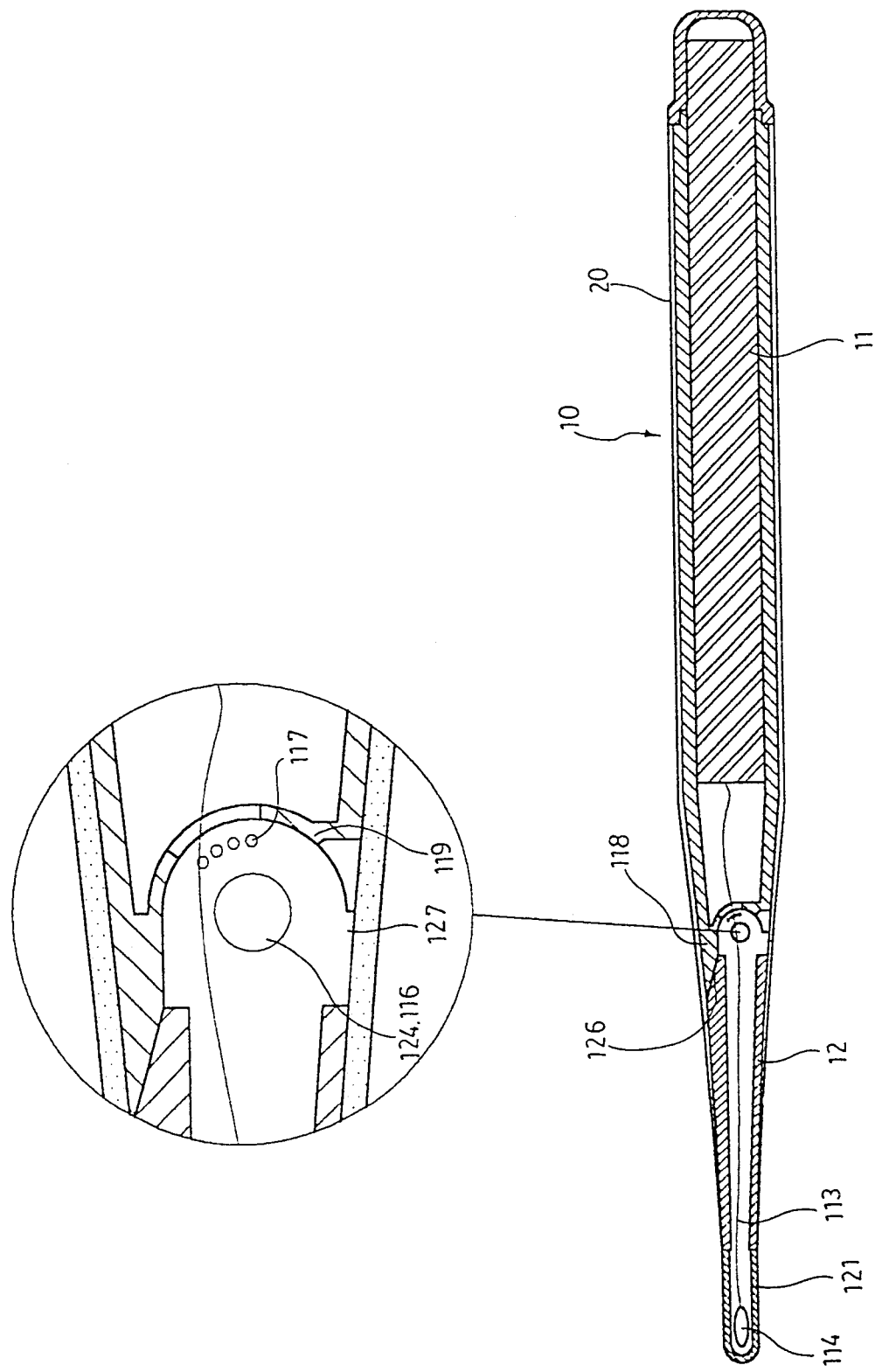
FIG. 2 is a sectional view of an improved structure of the measuring end of a clinical thermometer of the present invention.
Figure 3:
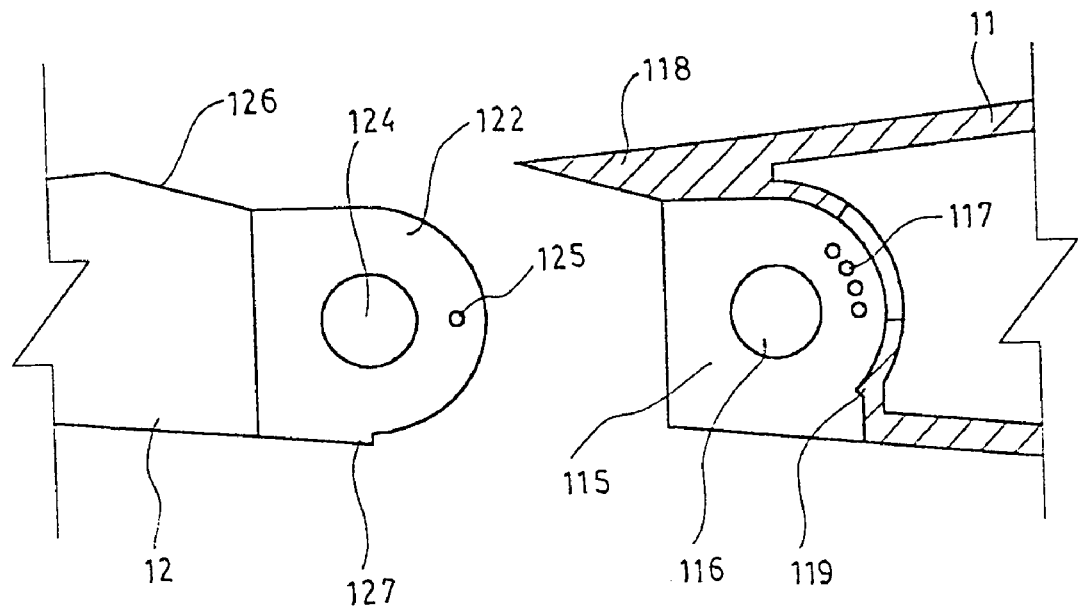
FIG. 3 is a sectional enlarged view of the actuating articulation of the improved structure of the measuring end of a clinical thermometer of the present invention.
Figure 5:
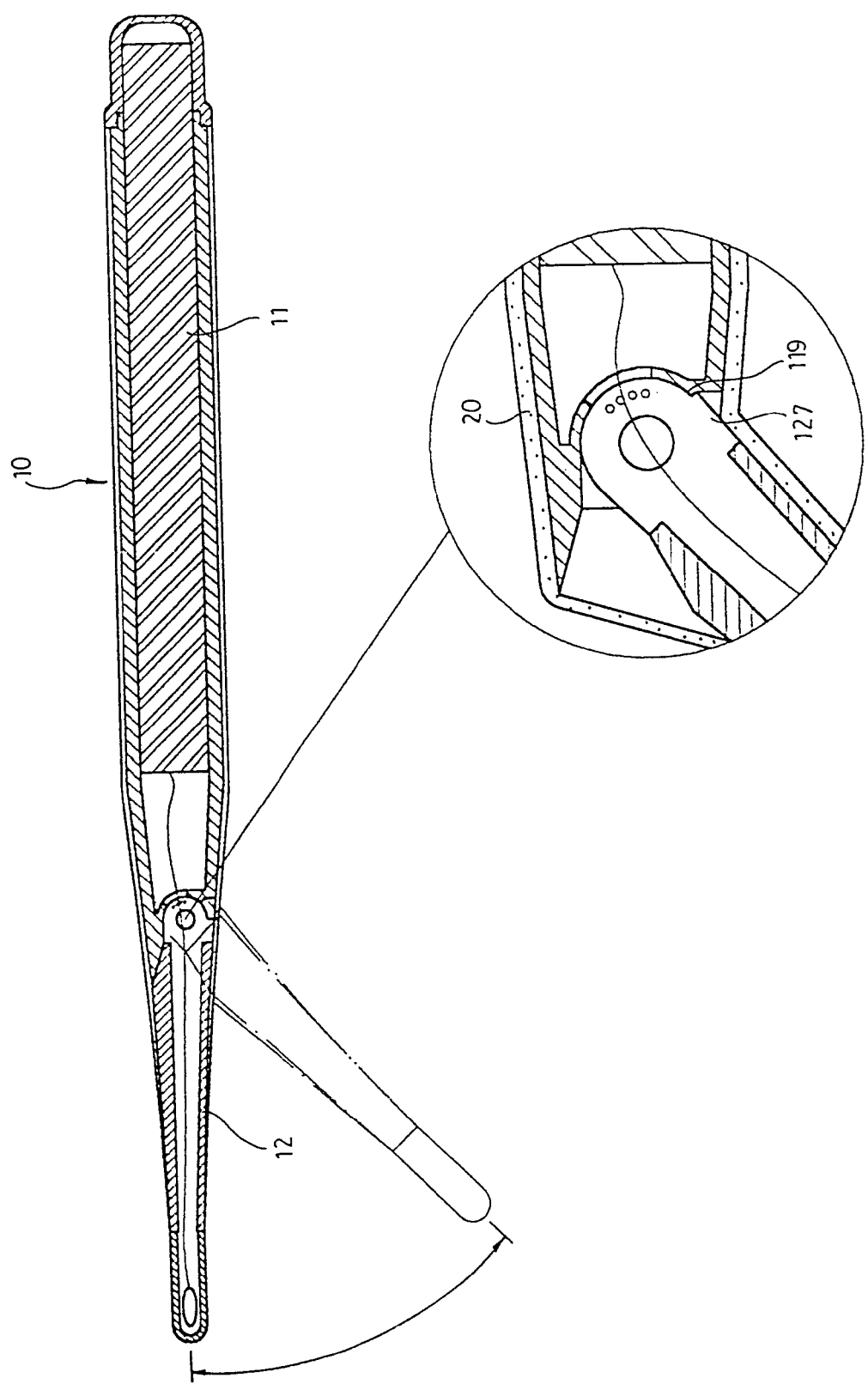
FIG. 5 is a sectional view of the improved structure of the measuring end of a clinical thermometer showing the positioning of the measuring end.

With reference to FIGS. 1, 2 and 3, there is shown a clinical thermometer having a body 11 and a measuring end 12, wherein the body 11 is provided with a switch 111 and a liquid crystal display 112. The front end of the measuring end 12 is mounted with a metallic head portion 121. A pivotal actuating articulation structure is formed at the connection of the body 11 and the measuring end 12. In accordance with the present invention, the end connecting the measuring end 12 is provided with a pair of protruded extensions 122 and an opening 123 formed between the extensions 122 to allow the passage of a connection wire 11 3, and a sensor 114 mounted to the measuring end 12. The external surface of the extensions 122 is provided with a larger engaging element 124 and a protrusion 125, such that the two extensions 122 can be engaged at a recess 115 provided at the end section of the body 11 and the engaging element 124 is engaged at an engaging hole 116 at the lateral wall within the recess 115, and the protrusion 125 is engaged at a cavity 117 provided to the lateral wall of the recess 115, thereby the measuring end 12 is turnable about the connection at the body 11 and can be positioned at an appropriate angle. In accordance with the present invention, the measuring end 12 is bent downward and, the top edge of the recess 115 is extended to form a covering plate 118. During assembling, the covering plate 118 is extended above a sloping face 126 at the top of the measuring end 12 such that the upward bending of the measuring end 12 is restricted by the covering plate 118. In addition, within the recess 115, the bottom section of the extensions 122 is individually provided with a protruded urging sections 127, 119. Thus, the downward bending of the measuring end 12 is positioned at the maximum angle (for instance, at 45C). The articulation is covered with an outer jacket 20 to provide an aesthetic appearance but the jacket 20 will not affect the bending of the measuring end 12. Referring to FIG. 5, in application of the thermometer of the present invention, the measuring end 12 is bent downward and the rotation is engaged at the cavity 117 by the protrusion 125, and a sound can be heard to indicate the measuring end 12 is in position. The number of cavity 117 is made to meet the required bending angle. In addition, if the measuring end 12 has bent to a predetermine maximum angle, (for instance, 45C), the urging section 127 of the measuring end 12 touches the urging section 119 of the body, the measuring end 12 will stop downward bending and will stop at this position.

Figure 4:
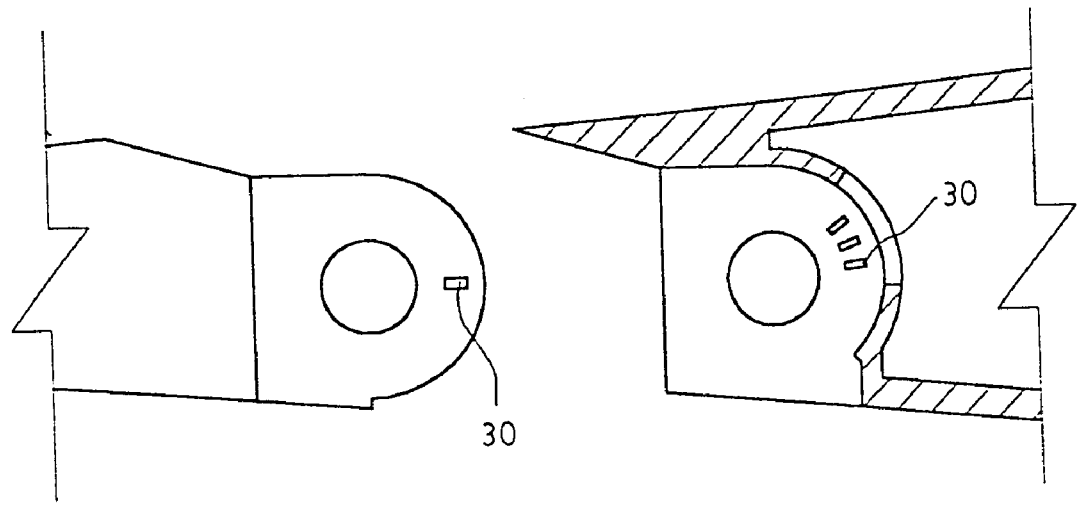
FIG. 4 is a sectional enlarged view of another preferred embodiment of the actuating articulation of the present invention.

FIG. 4 shows the actuating articulation structure. In accordance with the present invention, the position of the measuring end 12 can be secured by an embossed mark 30 to replace the protrusion.

Figure 6:
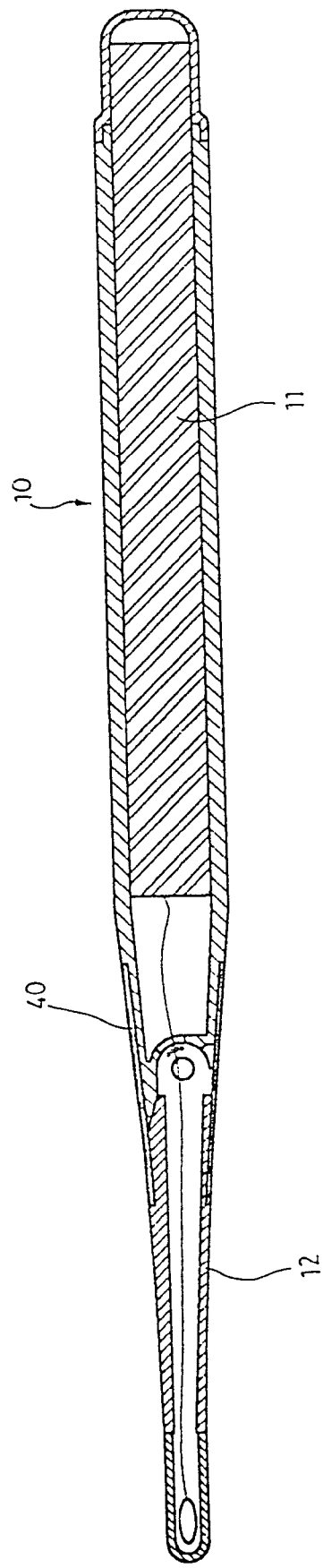
FIG. 6 is a schematic view showing the outer jacket of the present invention.

Referring to FIG. 6, a soft material 40 is mounted at the actuating articulation so as to provide an aesthetic appearance to the clinical thermometer and also to save cost of material.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An improved structure of a clinical thermometer having a body and a measuring end, characterized in that a pivotal actuating articulation is formed at a junction connecting the measuring end and the body such that the measuring end can be turned and positioned at an angle, thereby the user can hold the thermometer in a comfortable position in measuring the body temperature, wherein said pivotal actuating articulation structure is formed at the connection of the body and the measuring end, and the end connecting the measuring end is provided with a pair of protruded extensions, and an opening formed between the extensions to allow the passage of a connection wire and a sensor mounted to the measuring end, the external surface of each of the extensions is provided with a larger engaging element and a protrusion such that the two extensions can be engaged at a recess provided at the end section of the body, said engaging element is engaged at an engaging hole at a lateral wall within the recess, and the protrusion is engaged at a cavity provided to the lateral wall of the recess, the top end of the recess is extended with a covering plate, the covering plate is extended above a sloping face at the top of the measuring end such that the upward bending of the measuring end is restricted by the covering plate, thereby the measuring end is adjustable and positioned at an angle.

2. The improved structure of a clinical thermometer as claimed in claim 1, wherein the cavity and the protrusion are in the form of an embossed mark and a corresponding protrusion to position the measuring end of the thermometer.

3. The improved structure of a clinical thermometer as claimed in claim 1, wherein a soft material jacket is used to cover the entire thermometer.

4. The improved structure of a clinical thermometer as claimed in claim 1, wherein the pivotal actuating articulation is covered with a soft material.

* * * * *